(12) United States Patent
Pettey et al.

(10) Patent No.: US 8,933,171 B2
(45) Date of Patent: Jan. 13, 2015

(54) COLD FLOW RESISTANT COMPOSITIONS CONTAINING RUBBER AND A BLOCK COPOLYMER

(71) Applicant: Chevron Phillips Chemical Company LP, The Woodlands, TX (US)

(72) Inventors: Cliff C. Pettey, Fleming, OH (US); David L. Hartsock, Bartlesville, OK (US); Jinping Joe Zhou, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/789,786

(22) Filed: Mar. 8, 2013

(65) Prior Publication Data

US 2013/0303696 A1 Nov. 14, 2013

Related U.S. Application Data

(60) Provisional application No. 61/644,016, filed on May 8, 2012.

(51) Int. Cl.
*C08L 53/02* (2006.01)
*C08L 9/00* (2006.01)

(52) U.S. Cl.
CPC .............. *C08L 53/02* (2013.01); *C08L 53/025* (2013.01); *C08L 9/00* (2013.01)
USPC .............................................. 525/89; 525/99

(58) Field of Classification Search
USPC ................................................ 525/71, 99, 89
See application file for complete search history.

(56) References Cited

U.S. PATENT DOCUMENTS

| | | | |
|---|---|---|---|
| 3,639,517 A | 2/1972 | Kitchen et al. | |
| 3,758,656 A | 9/1973 | Shih | |
| 4,130,606 A * | 12/1978 | Van Ballegooijen et al. | 525/237 |
| 5,153,076 A * | 10/1992 | Jadamus et al. | 428/521 |
| 5,286,792 A * | 2/1994 | Wu et al. | 525/84 |
| 5,679,744 A * | 10/1997 | Kawauzra et al. | 525/98 |
| 5,756,579 A * | 5/1998 | Fornasari et al. | 525/99 |
| 6,096,828 A | 8/2000 | DePorter et al. | |
| 6,420,486 B1 | 7/2002 | DePorter et al. | |
| 6,444,755 B1 | 9/2002 | DePorter et al. | |
| 6,835,778 B2 | 12/2004 | Swisher et al. | |
| 7,037,980 B2 | 5/2006 | Stacy et al. | |
| 7,193,014 B2 | 3/2007 | Wilkey et al. | |
| 7,875,678 B2 | 1/2011 | Hanner et al. | |
| 2006/0089457 A1 | 4/2006 | Hartsock et al. | |
| 2006/0235130 A1 * | 10/2006 | Hanner et al. | 524/457 |
| 2007/0173605 A1 | 7/2007 | Brown et al. | |
| 2008/0134642 A1 | 6/2008 | Brown et al. | |
| 2010/0273950 A1 * | 10/2010 | Montoya-Goni et al. | 525/222 |
| 2011/0201757 A1 * | 8/2011 | Sosa et al. | 525/232 |
| 2012/0071583 A1 | 3/2012 | Uchiyama et al. | |
| 2012/0198722 A1 * | 8/2012 | Imazato et al. | 36/84 |
| 2013/0164476 A1 * | 6/2013 | Balfour | 428/36.92 |

FOREIGN PATENT DOCUMENTS

| | | |
|---|---|---|
| EP | 0 703 252 | 3/1996 |
| EP | 0 884 360 | 12/1998 |
| EP | 1 443 078 | 8/2004 |
| WO | WO 01/25303 | 4/2001 |

OTHER PUBLICATIONS

International Search Report and Written Opinion for PCT/US2013/029865 dated Jul. 23, 2013. 9 pages.

* cited by examiner

*Primary Examiner* — Jeffrey Mullis
(74) *Attorney, Agent, or Firm* — Merchant & Gould

(57) ABSTRACT

Disclosed are cold flow resistant and dimensionally stable compositions containing a diene rubber and a conjugated diene monovinylarene block copolymer, and generally, these compositions have solutions viscosities and cold flows that are less than that of the diene rubber. Methods for reducing cold flow and for storage-stabilizing bales of diene rubbers also are disclosed.

29 Claims, No Drawings

COLD FLOW RESISTANT COMPOSITIONS CONTAINING RUBBER AND A BLOCK COPOLYMER

REFERENCE TO RELATED APPLICATION

This application claims the benefit of U.S. Provisional Application Ser. No. 61/644,016, filed on May 8, 2012, the disclosure of which is incorporated herein by reference in its entirety.

BACKGROUND OF THE INVENTION

Many commercial grades of rubber are shipped and stored in the form of a solid slab, often referred to as a bale. However, over time and particularly at elevated temperatures, the bale of rubber can exhibit cold flow, manifesting in dimensional changes of the bale. It would be beneficial to have a rubber composition that has greater resistance to cold flow during shipping and/or long-term storage, and moreover, when conditions of higher temperature may be encountered. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Cold flow resistant and dimensionally stable compositions are disclosed and described herein, and such compositions can comprise (a) a diene rubber, and (b) a conjugated diene monovinylarene block copolymer. These compositions can be characterized as having a solution viscosity that is less than the solution viscosity of the diene rubber, as well as a cold flow that is less than the cold flow of the diene rubber.

Another embodiment of this invention is directed to a method for concurrently reducing the cold flow and the solution viscosity of a diene rubber, and in this embodiment, the method can comprise combining the diene rubber with a conjugated diene monovinylarene block copolymer to form a cold flow resistant composition. The solution viscosity of the composition can be less than the solution viscosity of the diene rubber, and the cold flow of the composition can be less than the cold flow of the diene rubber.

Embodiments of the invention also are directed to methods for storage-stabilizing a bale of diene rubber. One such method can comprise adding a conjugated diene monovinylarene block copolymer to the diene rubber to form a cold flow resistant composition. The resultant cold flow composition can have both a solution viscosity and a cold flow that is less than the respective solution viscosity and cold flow of the diene rubber.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a composition consisting essentially of a material includes impurities and additives typically present in a commercially produced or commercially available sample of the recited material. When a claim includes different features and/or feature classes (for example, a method step, composition features, and/or property features, among other possibilities), the transitional terms comprising, consisting essentially of, and consisting of, apply only to the feature class to which it is utilized, and it is possible to have different transitional terms or phrases utilized with different features within a claim. For example, a method can comprise several recited steps (and other non-recited steps), but utilize a composition consisting of a specific material and other components; alternatively, consisting essentially of a specific material and other components; or alternatively, comprising a specific material and other components and other non-recited components.

Therefore, while compositions and methods are described in terms of "comprising" various components or steps, the compositions and methods can also "consist essentially of" or "consist of" the various components or steps, unless stated otherwise. For example, a cold flow resistant composition provided in an embodiment of the invention can comprise, or alternatively, consist essentially of, or alternatively, consist of, a diene rubber and a conjugated diene monovinylarene block copolymer.

The terms "a," "an," and "the" are intended to include plural alternatives, e.g., at least one. For instance, the disclosure of "a conjugated diene monovinylarene block copolymer," "a diene rubber," etc., is meant to encompass one, or mixtures or combinations of more than one conjugated diene monovinylarene block copolymer, diene rubber, etc., unless otherwise specified.

The term "polymer" is used herein generically to include homopolymers, copolymers, terpolymers, and so forth, while a "copolymer" is used generically to include copolymers, terpolymers, and so forth. Thus, "polymer" and "copolymer"

encompass polymeric materials derived from any monomer and comonomer (one or more than one) disclosed herein.

As used herein, a "conjugated diene" refers to an organic compound containing conjugated carbon-carbon double bonds and often a total of 4 to 12 carbon atoms, such as 4 to 8 carbon atoms. Exemplary conjugated dienes can include, but are not limited to, 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and the like, as well as mixtures thereof. For example, in some embodiments disclosed herein, the conjugated diene can be 1,3-butadiene. A unit of a polymer, wherein the unit is derived from polymerization of a conjugate diene monomer, is referred to as a "conjugated diene unit."

As used herein, "monovinylarene" refers to an organic compound containing a single carbon-carbon double bond, at least one aromatic moiety, and often a total of 8 to 18 carbon atoms, such as 8 to 12 carbon atoms. Exemplary monovinylarenes can include, but are not limited to, styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and the like, as well as mixtures thereof. For example, in some embodiments disclosed herein, the monovinylarene can be styrene. A unit of a polymer, wherein the unit is derived from polymerization of a monovinylarene monomer, is referred to as a "monovinylarene unit."

A "conjugated diene monovinylarene block copolymer" is a polymer comprising monovinylarene units and conjugated diene units. The polymer comprises one or more blocks, wherein each block comprises monovinylarene units and/or conjugated diene units. Any particular block can comprise either or both monovinylarene units or conjugated diene units. If it comprises only one type of unit, it can be termed a "monoblock." If it comprises both, it can be termed a mixed block. Exemplary mixed blocks can include, but are not limited to, random blocks, tapered blocks, stepwise blocks, or any other type of mixed block.

A mixed block is "tapered" when both (a) the mole fraction of conjugated diene units in a first section of the block is higher than the mole fraction of conjugated diene units in a second section of the block, wherein the second section of the block is closer to a given end of the block, and (b) condition (a) is true for substantially all sections of the block. Depending on the size of the sections being considered, condition (a) may not be true for all sections, but if so, will be not true at no more than about the level expected by chance.

A mixed block is "random" when the mole fractions of conjugated diene units and monovinylarene units in a section of the block are substantially the same as the mole fractions of conjugated diene units and monovinylarene units in the entire block. This does not preclude the possibility of sections of the block having regularity (i.e., appearing non-random), but such regular sections will typically be present at no more than about the level expected by chance.

Although any methods and materials similar or equivalent to those described herein can be used in the practice or testing of the invention, the typical methods and materials are herein described.

All publications and patents mentioned herein are incorporated herein, in their entirety, by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. A representative example follows for the wt. % of the conjugated diene monovinylarene block copolymer in a cold flow resistant composition in an embodiment of this invention. For example, by a disclosure that the composition comprises from about 15 to about 30 wt. % of the conjugated diene monovinylarene block copolymer (based on the total weight of the composition), Applicants intend to recite that the weight percentage can be equal to about 15, about 16, about 17, about 18, about 19, about 20, about 21, about 22, about 23, about 24, about 25, about 26, about 27, about 28, about 29, or about 30 wt. %. Additionally, the weight percentage can be within any range from about 15 to about 30 wt. % (for example, the weight percentage can be in a range from about 15 to about 25 wt. %), and this also includes any combination of ranges between about 15 and about 30 wt. %. Likewise, all other ranges disclosed herein should be interpreted in a manner similar to this representative example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

The present disclosure provides cold flow resistant compositions containing a diene rubber, methods for concurrently reducing both the cold flow and the solution viscosity of a diene rubber, and methods for storage-stabilizing a bale of a diene rubber.

Cold Flow Resistant Compositions

Some embodiments of this invention are directed to cold flow resistant compositions which can comprise (a) a diene rubber, and (b) a conjugated diene monovinylarene block copolymer, while other embodiments are directed to methods for reducing the cold flow and the solution viscosity of a diene rubber, and such methods can comprise combining (e.g., blending, mixing, compounding, etc.) the diene rubber with a conjugated diene monovinylarene block copolymer to form a cold flow resistant composition. In these and other embodiments disclosed herein, the cold flow resistant composition can have both a solution viscosity and a cold flow which are less than the respective solution viscosity and cold flow of the diene rubber. Generally, the features of any of the compositions and methods disclosed herein (e.g., the diene rubber, the cold flow of the diene rubber, the solution viscosity of the diene rubber, the conjugated diene monovinylarene block copolymer, the relative amounts of the diene rubber and the conjugated diene monovinylarene block copolymer in the composition, the cold flow of the composition, the solution viscosity of the composition, among others) are independently described herein, and these features can be combined in any combination to further describe the disclosed compositions and methods.

The conjugated diene monovinylarene block copolymer can be combined (blended, mixed, compounded, etc.) with the diene rubber to form the cold flow resistant composition by any means know to those of skill in the art. Moreover, the conjugated diene monovinylarene block copolymer can be combined with the diene rubber at various steps within and/or after the rubber formation process, as would be recognized by those of skill in the art. For example, and not limited thereto, the conjugated diene monovinylarene block copolymer can be fed to an extruder that processes the rubber prior to baling, the conjugated diene monovinylarene block copolymer can be added to a finished rubber cement, the conjugated diene monovinylarene block copolymer can be added to rubber crumbs, the conjugated diene monovinylarene block copolymer can be blended with the rubber in a steam stripper, and/or the conjugated diene monovinylarene block copolymer can be solution blended with the rubber and then processed conventionally.

While not being limited thereto, particular embodiments contemplated herein are directed to cold flow resistant compositions in which the composition is in the form of a solid. For instance, in one embodiment, the composition can be a solid at a temperature of 25° C. (e.g., about ambient temperature). In another embodiment, the composition can be a solid at 40° C., at 50° C., or at 75° C. In yet another embodiment, the composition can be a solid at 100° C., at 125° C., or at 150° C. or even higher temperatures. In accordance with this disclosure, the cold flow resistant composition often can be described as a solid, and this is meant to encompass high viscosity liquids, as would be recognized by those of skill in the art. One particular solid form of the cold flow resistant composition can be a bale, which generally refers to a slab or block of rubber, which often can range in weight from 20 to 50 kg (e.g., about 30-31 kg), but not being limited thereto. Many commercially available diene rubber materials are shipped and/or stored in the form of a bale.

Additionally, or alternatively, the cold flow composition can be substantially free of a solvent. In this context, "substantially free" means that the composition (i.e., containing a diene rubber and a conjugated diene monovinylarene block copolymer) contains less than 1 wt. % solvent. For instance, the composition can contain less than 0.5 wt. % solvent, less than 0.25 wt. % solvent, less than 0.1 wt. % solvent, less than 0.05 wt. % solvent, or less than 0.01 wt. % solvent, based on the total weight of the composition. Accordingly, cold flow compositions that are substantially free of a solvent generally do not encompass mixtures of a diene rubber and a conjugated diene monovinylarene block copolymer in a solvent (or monomer) such as toluene, xylene, benzene, ethylbenzene, styrene, methylstyrene, acrylonitrile, and the like.

According to another embodiment of the invention, a method for storage-stabilizing a bale of diene rubber is provided herein, and this method can comprise adding a conjugated diene monovinylarene block copolymer to the diene rubber to form a cold flow resistant composition. The resultant cold flow resistant composition can have both a solution viscosity and a cold flow which are less than the respective solution viscosity and cold flow of the diene rubber. In this embodiment, "storage-stabilizing" a bale of rubber is meant to encompass, for example, stabilizing the bale during long-term storage at ambient or elevated temperatures, stabilizing the bale during shipping at ambient or elevated temperatures (e.g., transport-stabilizing), and so forth. As noted hereinabove, the features of this method of storage-stabilizing a bale of diene rubber disclosed herein (e.g., the diene rubber, the cold flow of the diene rubber, the solution viscosity of the diene rubber, the conjugated diene monovinylarene block copolymer, the relative amounts of the diene rubber and the conjugated diene monovinylarene block copolymer in the composition, the cold flow of the composition, the solution viscosity of the composition, among others) are independently described herein, and these features can be combined in any combination to further describe the disclosed storage-stabilizing methods.

Bales disclosed herein can contain a cold flow resistant composition, e.g., a diene rubber and a conjugated diene monovinylarene block copolymer, and these bales can have improved dimensional stability over a wide range of temperatures and time periods, as compared to bales containing only the diene rubber. By describing the bale as being "dimensionally stable," it is meant that the difference in cross-sectional area of the bottom surface of the bale from the beginning to the end of the time/temperature condition is within +/−10%. In one embodiment, for example, the cold flow resistant bale can be dimensionally stable at 25° C. for at least 1 day; alternatively, for at least 1 week; alternatively, for at least 1 month; alternatively, for at least 6 months, or alternatively, for at least 1 day up to 12 months. In another embodiment, the bale can be dimensionally stable at 35° C. for at least 1 day; alternatively, for at least 1 week; alternatively, for at least 1 month; alternatively, for at least 6 months; or alternatively, for at least 1 day up to 12 months. In yet embodiment, the bale can be dimensionally stable at 45° C. for at least 1 day; alternatively, for at least 1 week; alternatively, for at least 1 month; alternatively, for at least 6 months; or alternatively, for at least 1 day up to 12 months. In still another embodiment, the bale can be dimensionally stable at 60° C. for at least 1 day; alternatively, for at least 1 week; alternatively, for at least 1 month; alternatively, for at least 6 months; or alternatively, for at least 1 day up to 12 months.

A feature of the compositions and methods disclosed herein can be an improvement in cold flow performance of the composition as compared to the diene rubber alone. For instance, the cold flow resistant composition can have a "cold flow" which is less than the respective cold flow of the diene rubber. The cold flow is measured in accordance with the procedure described herein below and in U.S. Pat. No. 3,758,656, which is incorporated by reference in its entirety. Many commercially available diene rubbers can have a measured cold flow of at least 25%, at least 30%, at least 35%, at least 40%, or at least 50%, and occasionally, as high as 60-70%. Such rubber materials are not dimensionally stable over a wide range of temperatures and time periods. Cold flow resistant compositions, on the other hand, can have much lower measured cold flow percentages, for instance, less than 30%, less than 25%, less than 20%, less than 15%, less than 10%, or less than 5%. Moreover, the cold flow of the composition can be less than 1%, or substantially zero (i.e., no measurable cold flow), in certain embodiments.

The improvement in cold flow of the composition as compared to that of the diene rubber can be determined by the difference between the measured cold flow of the composition and the measured cold flow of the diene rubber. The cold flow testing is on the same equipment/apparatus and under the same test procedures/conditions. In one embodiment, the cold flow of the composition can be at least 10 percentage points less than the cold flow of the diene rubber (e.g., up to 70 percentage points less, or up to 60 percentage points less, or to 50 percentage points less, or up to 40 percentage points less). In another embodiment, the cold flow of the composition can be at least 20 percentage points less than the cold flow of the diene rubber. Yet, in another embodiment, the cold flow of the composition can be at least 30 percentage points less than the cold flow of the diene rubber. As an example, if the measured cold flow of the composition is 13%, and the measured cold flow of the diene rubber is 47%, then the cold flow of the composition would be at least 30 percentage points less than the cold flow of the diene rubber (47% minus 13% equals 34%).

Typically, prior endeavors to improve the cold flow performance (e.g., less cold flow) of a diene rubber have resulted in higher viscosities. For instance, reducing cold flow of a diene rubber often can require an increased viscosity of the diene rubber, or an increased viscosity of the formulation containing the diene rubber. In some embodiments, reducing cold flow of a diene rubber can involve the use of methods to introduce branching in the diene rubber or blending the diene rubber with a branched material. For instance, reducing cold flow of a diene rubber can involve the use of a multi-functional monomer such as divinylbenzene, or the introduction of crosslinking. However, these methods often increase the viscosity of the formulation containing the diene rubber. Unexpectedly, and in accordance with the present invention, the composition with improved cold flow performance (e.g., less cold flow) also can have a solution viscosity that is less than that of the diene rubber. The solution viscosity testing is on the same equipment/apparatus and under the same test procedures/conditions. While not wishing to be bound by theory, Applicants believe that a lower viscosity can be beneficial in the processing and production of high impact polymer compositions, such as high impact polystyrene (HIPS). In some embodiments, the solution viscosity of the composition can be at least 10% less than the solution viscosity of the diene rubber, while in other embodiments, the solution viscosity of the composition can be at least 25% less than the solution viscosity of the diene rubber. Yet, in further embodiments, the solution viscosity of the composition can be at least 40% less, at least 50% less, at least 60% less, at least 75% less, at least 85% less, at least 90% less, from at least 10% up to 99% less, from at least 25% up to 98% less, or from at least 40% up to 95% less, than the solution viscosity of the diene rubber. As an example, if the measured solution viscosity of the composition is 700 cP, and the measured solution viscosity of the diene rubber is 5,000 cP, then the solution viscosity of the composition would be at least 85% less than the solution viscosity of the diene rubber (4,300 divided by 5,000 equals 86%).

While not being limited thereto, the cold flow resistant composition often can comprise from about 5 to about 50 wt. % of the conjugated diene monovinylarene block copolymer. This weight percentage is based on the total weight of the composition. Suitable ranges for the weight percentage of the conjugated diene monovinylarene block copolymer, based on the total weight of the composition, can include, but are not limited to, the following ranges: from about 10 to about 40 wt. %, from about 15 to about 40 wt. %, from about 10 to about 30 wt. %, from about 15 to about 30 wt. %, from about 10 to about 25 wt. %, or from about 15 to about 25 wt. %, and the like. The specific amount of the conjugated diene monovinylarene block copolymer utilized in the composition can depend on the desired cold flow characteristics, the desired viscosity, the anticipated storage/shipping temperature and time conditions, the grade of diene rubber, the grade of the conjugated diene monovinylarene block copolymer, amongst other variables.

Another feature of the compositions and methods disclosed herein can be a Dimensional Stability Factor (DSF) of greater than 2. The DSF is measured in accordance with the procedure described herein below for Examples 75-90, and uses data from an extended 16-hr cold flow test. The DSF is the ratio of the stress of the composition after a 16-hr cold flow test to the stress of a standard single bale of rubber. Using the test procedure described herein, the maximum DSF is about 6.4 (i.e., with no measurable cold flow in 16 hr). In some embodiments, the disclosed cold flow resistant compositions can have a DSF of greater than or equal to 2.5, or greater than or equal to 3.0, or from 2.5 to about 6.4, or from 3.0 to about 6.4, while in other embodiments, the disclosed cold flow resistant compositions can have a DSF of greater than or equal to 3.5, greater than or equal to 4.0, greater than or equal to 4.5, greater than or equal to 5.0, from 4.0 to about 6.4, or from 5.0 to about 6.4.

Conjugated Diene Monovinylarene Block Copolymers

Consistent with embodiments disclosed herein, the addition of a conjugated diene monovinylarene block copolymer to a diene rubber can result in a composition having less cold flow and a lower solution viscosity than that of the diene rubber in the absence of the conjugated diene monovinylarene block copolymer. While not being limited thereto, certain suitable conjugated diene monovinylarene block copolymers that can be employed in various embodiments of this invention are described in U.S. Pat. Nos. 3,639,517, 6,096,828, 6,420,486, 6,444,755, 6,835,778, 7,037,980, 7,193,014, and 7,875,678, the disclosures of which are incorporated herein by reference in their entirety; and U.S. Patent Publication Nos. 2006/0089457, 2007/0173605, and 2008/0134642, the disclosures of which are incorporated herein by reference in their entirety.

The relative amount of conjugated diene and monovinylarene in the block copolymer utilized in the composition can depend on many variables, such as on the desired cold flow characteristics, the desired viscosity, the anticipated storage/shipping temperature and time conditions, the grade of diene rubber, the amount of the conjugated diene monovinylarene block copolymer used in the composition, amongst other variables. Nonetheless, the conjugated diene monovinylarene block copolymer typically can have from about 15 to about 95 wt. %, or from about 25 to about 95 wt. %, monovinylarene monomer content, based on the total weight of the (final) block copolymer. In some embodiments, the conjugated diene can be the major component, and the conjugated diene monovinylarene block copolymer can have from about 20 to about 50 wt. % monovinylarene monomer content, from about 25 to about 50 wt. % monovinylarene monomer content, from about 20 to about 45 wt. % monovinylarene monomer content, or from about 25 to about 45 wt. % monovinylarene monomer content, based on the total weight of the block copolymer. In other embodiments, the monovinylarene can be the major component, and the conjugated diene monovinylarene block copolymer can have from about 50 to about 95 wt. % monovinylarene monomer content, from about 50 to about 80 wt. % monovinylarene monomer content, from about 55 to about 85 wt. % monovinylarene monomer content, or from about 65 to about 80 wt. % monovinylarene monomer content, based on the total weight of the block copolymer.

In an embodiment of this invention, the conjugated diene monovinylarene block copolymer can comprise an uncoupled conjugated diene monovinylarene block copolymer. Uncoupled block copolymers often can be referred to in the art as terminated or quenched copolymers. In further embodiments, the conjugated diene monovinylarene block copolymer can comprise an uncoupled unimodal conjugated diene monovinylarene block copolymer, or alternatively, the block copolymer can comprise an uncoupled multimodal conjugated diene monovinylarene block copolymer.

In an embodiment of this invention, the conjugated diene monovinylarene block copolymer can comprise a coupled conjugated diene monovinylarene block copolymer, and further, the coupled conjugated diene monovinylarene block copolymer can be a coupled unimodal conjugated diene monovinylarene block copolymer or a coupled multimodal conjugated diene monovinylarene block copolymer. In some embodiments, the block copolymer can be produced by coupling at least two different living polymer chains having been produced by at least two separate charges of initiator.

In an embodiment, the conjugated diene monovinylarene block copolymer can comprise a multimodal conjugated diene monovinylarene block copolymer containing at least two modes. In another embodiment, the block copolymer can comprise at least 2 blocks selected from any combination of conjugated diene blocks, monovinylarene blocks, or conjugated diene monovinylarene mixed blocks. Alternatively, the block copolymer can comprise at least 3 blocks, at least 4 blocks, or at least 5 blocks, selected from any combination of conjugated diene blocks, monovinylarene blocks, or conjugated diene monovinylarene mixed blocks. For example, the conjugated diene monovinylarene block copolymer can comprise from 3 to 10 blocks, from 4 to 7 blocks, or from 4 to 5 blocks, selected from any combination of conjugated diene blocks, monovinylarene blocks, or conjugated diene monovinylarene mixed blocks. In these and other embodiments, the first two blocks can be monovinylarene blocks and, additionally or alternatively, the last block prior to the coupling agent can be a conjugated diene block. In accordance with this disclosure, repeated blocks with an intervening charge of initiator are not considered to be one block. Likewise, repeated mixed blocks also are not considered to be one block.

In certain embodiments, the block copolymer can comprise a plurality of mixed conjugated diene monovinylarene blocks, wherein each mixed conjugated diene monovinylarene block can contain conjugated diene units and monovinylarene units with a weight ratio of conjugated diene units to monovinylarene units in a range from about 0.05 to about 0.33, from about 0.06 to about 0.28, or from about 0.08 to about 0.26.

Also contemplated herein are block copolymers that can comprise mixed conjugated diene monovinylarene blocks selected from random blocks, tapered blocks, or combinations thereof. For instance, in one embodiment, the conjugated diene monovinylarene block copolymer can comprise at least three consecutive conjugated diene monovinylarene mixed blocks. In another embodiment, the block copolymer can comprise at least three consecutive tapered mixed blocks. In yet another embodiment, the block copolymer can comprise at least three consecutive random mixed blocks.

In accordance with the present invention, the conjugated diene monovinylarene block copolymer can comprise a block structure having the formula:

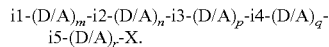

In this formula, A can be a monovinylarene in the range of 0 to 50 phr (i.e., parts per hundred monomers by weight), and D can be a conjugated diene or mixture of different conjugated dienes in the range of 0 to 50 phr, with A and D totaling 100 parts. D/A can be a mixture of conjugated diene(s) and monovinylarene, with the ratio of D/A in each block being the same or different, and typically in the range of from 0:50 to 50:0 phr. Independently, i1 to i5 can be initiating catalysts in a range from 0 to 0.2 phr, the presence of which can start a new polymer chain. Also independently, m, n, p, q, and r can be integers in a range from 0 to 3, inclusive. X in the above formula can be a coupling agent or a terminator.

The conjugated diene monovinylarene block copolymer can comprise at least one of the following block structures in another embodiment consistent with this disclosure:
(A) i-S-S-i-S-B-X;
(B) i-S-i-S-B-i-S-B-X;
(C) i-S-i-S-(B/S)-i-S-B-X;
(D) i-S-i-S-(B/S)-(B/S)-X;
(E) i-S-i-S-(B/S)-(B/S)-B-X;
(F) i-S-i-S-(B/S)-(B/S)-(B/S)-X;
(G) i-S-i-S-(B/S)-(B/S)-(B/S)-B-X;
(H) i-S-i-S-(B/S)-(B/S)-(B/S)-(B/S)-X; or
(I) i-S-i-S-(B/S)-(B/S)-(B/S)-(B/S)-B-X.

In formulas (A) to (I), S can be a styrene block, B can be a conjugated diene block, and B/S can be a conjugated diene monovinylarene mixed block. Each i independently can be an initiator, the presence of which can start a new polymer chain. X in these formulas can be a coupling agent or a terminator.

Various monovinylarenes and conjugated dienes can be used to form block copolymers that are suitable for use in the disclosed cold flow resistant compositions. While not being limited thereto, the monovinylarene often can contain from 8 to 18 carbon atoms (e.g., the monovinylarene can be styrene), and the conjugated diene can contain from 4 to 12 carbon atoms (e.g., the conjugated diene can be a butadiene, such as 1,3-butadiene). Accordingly, in a particular embodiment disclosed herein, the conjugated diene monovinylarene block copolymer can comprise a styrene butadiene block copolymer (SBC).

Many commercially available styrene butadiene block copolymers can be employed in the cold flow resistant compositions described herein, including, but not limited to, K-Resin® SBC grades available from Chevron Phillips Chemical Company LP, such as, for instance, DK11, KR52, KR53, XK40, KR05, and KK38; SBC grades available from Styrolution, such as, for instance, 3G46, 3G55 and 2G66; SBC grades available from Dexco Polymers, such as, for instance, Vector® 8508, Vector® 6507, and Vector® 6241; SBC grades available from Kraton Performance Polymers, such as, for instance, D1155, D1118, D1116, and D1124; SBC grades available from LCY Chemical Industry Corp., such as, for instance, LCY3527 and LCY3114; SBC grades available from SINOPEC Corporation (China Petroleum & Chemical Corporation); SBC grades available from Denka (Denki Kagaku Kogyo K.K.; Denka Chemical Holdings Asia Pacific Pte Ltd.); SBC grades available from Asahi (Asahi Kasei Chemicals Corporation); and the like, as well as mixtures or combinations thereof.

Diene Rubbers

The type or grade of diene rubber that can benefit from the addition of a conjugated diene monovinylarene block copolymer is not particularly limited. As non-limiting examples, the diene rubber can comprise a polybutadiene, a polyisoprene, a poly-2-chloro-1,3-butadiene, a poly-1-chloro-1,3-butadiene, an ethylene/propylene terpolymer, a butadiene/acrylonitrile copolymer, a butyl rubber, an acrylic rubber, a styrene/isobutylene/butadiene copolymer, an isoprene/acrylic ester copolymer, and the like, as well as mixtures or combinations thereof. In certain embodiments, the diene rubber can comprise a polybutadiene rubber, and the polybutadiene rubber can be a high cis polybutadiene rubber or a low cis polybutadiene rubber. In one embodiment, the diene rubber can comprise a high cis polybutadiene rubber that contains from 60 to 95 mol % cis double bonds, while in another embodiment, the diene rubber can comprise a low cis polybutadiene rubber that contains from 20 to 60 mol % cis double bonds. Yet, in other embodiments, the diene rubber can comprise a diene monovinylarene rubber, and further, the diene monovinylarene rubber can contain up to 40 wt. % styrene. A particular example of a diene monovinylarene rubber suitable for use as described herein is styrene butadiene rubber (SBR).

Many commercially available diene rubbers suitable for use as described herein can include, but are not limited to, Ubepol® BR15HB and BR14HB from Ube Industrial, Ltd.; Diene® 55AC10 and Diene® 35AC10 from Firestone Polymers; Asadene 35AE, Asadene 55AE, and Asaprene 730AX, available from Asahi Kasei Chemicals Corporation; various rubber grades available from SINOPEC Corporation (China Petroleum & Chemical Corporation); and the like, and this includes mixtures or combinations of two or more of these materials.

Impact Polymer Compositions

High impact polymer compositions can be produced from the cold flow resistant compositions disclosed herein. One such high impact polymer composition can comprise (i) a monovinylarene-based polymer, and (ii) from about 1 to about 35 wt. % particles dispersed in the polymer, the particles comprising any of the cold flow resistant compositions disclosed or described herein. In an embodiment, the high impact polymer composition can comprise from about 2 to about 30 wt. %, or from about 3 to about 30 wt. %, particles comprising the cold flow resistant composition. In another embodiment, the high impact polymer composition can comprise from about 4 to about 25 wt. % particles comprising the cold flow resistant composition. In yet another embodiment, the high impact polymer composition can comprise from about 5 to about 20 wt. %, or from about 8 to about 18 wt. %, particles comprising the cold flow resistant composition. In these and other embodiments, at least a portion of the monovinylarene-based polymer can be grafted with the cold flow resistant composition. The cold flow resistant composition can be grafted with the monovinylarene-based polymer to the extent that there is at least a portion of the monovinylarene-based polymer present as grafts on the cold flow resistant composition. For instance, the cold flow resistant composition can represent a main chain and the grafted monovinylarene-based polymer can represent side chains composed of monovinylarene homopolymers or copolymers.

The monovinylarene-based polymer can comprise a polystyrene in one embodiment, and accordingly, the high impact polymer composition can comprise a high impact polystyrene. In another embodiment, the monovinylarene-based polymer can be a copolymer derived from a monovinylarene monomer and an acrylic monomer, or alternatively, the monovinylarene-based polymer can be a copolymer derived from a monovinylarene monomer and a methacrylate monomer. Often, in these embodiments, the monovinylarene-based polymer can have from about 55 to about 95 wt. % monovinylarene monomer content, based on the total weight of the polymer. For example, the monovinylarene-based polymer can have from about 55 to about 80%, or from about 65 to about 85 wt. %, monovinylarene monomer content, based on the total weight of the polymer. In some embodiments, the monovinylarene monomer can be styrene, the acrylic monomer can be acrylonitrile, and the high impact polymer composition can be an acrylonitrile butadiene styrene polymer (ABS). In other embodiments, the monovinylarene monomer can be styrene, the methacrylate monomer can be methyl methacrylate, and the high impact polymer composition can be a methyl methacrylate butadiene styrene polymer (MBS).

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Solution viscosities (cP or Pa-s) were measured in 14% solids in toluene with a Brookfield R/S-CPS+ Rheometer at 30° C., unless stated otherwise.

Mooney Viscosity measurements (ML/4/100° C.) were determined in accordance with ASTM 1646-95.

Cold flow measurements (%) were conducted as follows. The test material (base rubber, mixture of rubber and SBC, etc.) was dissolved in THF, mixed thoroughly, and dried in a vacuum to remove the solvent. Then, the test material was molded at 350° F. (177° C.) into a cylindrical specimen having a diameter of ¾" (1.9 cm) and a height of ½" (1.27 cm). The test specimen and a 350 g cylinder with a 3-inch (7.6 cm) diameter were preconditioned at 150° F. (65° C.) for 1 hr. Then, the test specimen was compressed by the 350 g weight for 1 hr at 150° F. (65° C.) as described in U.S. Pat. No. 3,758,656, the disclosure of which is incorporated herein by reference in its entirety. The specimen heights before and after the test are referred to as $h_o$ and $h_f$, respectively, with the cold flow (measured in %) determined by the equation: $100 \times (h_o - h_f)/h_o$. Cold flow percentages listed in the examples that follow reflect an average of two measurements.

Styrene percentage (%) in the examples that follow is the styrene monomer content in the block copolymer. In the case of general purpose polystyrene, the styrene monomer content is listed as 100%.

Grades of styrene butadiene block copolymers were obtained from Chevron Phillips Chemical Company LP, Styrolution, Dexco Polymers, Kraton Performance Polymers, and LCY Chemicals. SBC grades were given numerical designations and have the following respective styrene contents:

| | |
|---|---|
| SBC 1 (76% styrene) | SBC 2 (74% styrene) |
| SBC 3 (75% styrene) | SBC 4 (70% styrene) |
| SBC 5 (29% styrene) | SBC 6 (43% styrene) |
| SBC 7 (51% styrene) | SBC 8 (65% styrene) |
| SBC 9 (62% styrene) | SBC 10 (43% styrene) |
| SBC 11 (40% styrene) | SBC 12 (40% styrene) |
| SBC 13 (33% styrene) | SBC 14 (29% styrene) |
| SBC 15 (25% styrene) | SBC 16 (23% styrene) |
| SBC 17 (30% styrene, SIS copolymer) | |

Examples 1-5

Table I summarizes the viscosity and cold flow properties of various commercial grades of rubber available from Ube Industrial, Ltd., Firestone Polymers, Asahi Kasei Chemicals Corporation, and SINOPEC Corporation. The cold flows for these rubbers were at least 35%, and ranged to over 65%.

TABLE I

Examples 1-5.

| Example | Rubber Grade | Solution Viscosity (cP) | Dilute Solution Viscosity (cP)[A] | Mooney Viscosity[B] | Cold Flow (%) |
|---|---|---|---|---|---|
| 1 | BR1 | 5,200 | 60 | 40 | 37 |
| 2 | BR2 | 5,100 | 85 | 33 | 67 |
| 3 | BR3 | 1,600 | 35 | 47 | 59 |
| 4 | BR4 | 2,400 | — | — | 51 |
| 5 | BR5 | 17,400 | 170 | 55 | 46 |

[A]Data for Dilute Solution Viscosity with 5% solids in toluene was provided by the supplier of the rubber grade.
[B]Data for Mooney Viscosity was provided by the supplier of the rubber grade.

Examples 6-14

Table II summarizes viscosity and cold flow properties for neat BR4 and for mixtures with 25 wt. % of styrene block copolymers having a range of styrene monomer contents. Also included in Table II are viscosities for neat BR5 and for mixtures with 25 wt. % of styrene block copolymers having a range of styrene monomer contents. Unexpectedly, the addition of 25% of the styrene block copolymer both significantly reduced the cold flow and significantly reduced the viscosity. Interestingly, the addition of 25% of a styrene block copolymer having 70-80% styrene content completely eliminated the cold flow (i.e., cold flow is zero percent), as measured by the cold flow test described hereinabove.

TABLE II

Examples 6-14.

| Example | Rubber Grade | SBC Grade | Styrene (%) | Viscosity (Pa-s)[C] | Cold Flow (%) |
|---|---|---|---|---|---|
| 6 | BR5 | — | — | 164 | 41 |
| 7A | BR5 | SBC 1 | 76 | 16 | — |
| 7B | BR4 | SBC 1 | 76 | — | 0 |
| 8A | BR5 | SBC 2 | 74 | 19 | — |
| 8B | BR4 | SBC 2 | 74 | — | 0 |
| 9A | BR5 | SBC 3 | 75 | 11 | — |
| 9B | BR4 | SBC 3 | 75 | 13.4 | 0 |
| 10A | BR5 | SBC 4 | 70 | 10 | — |
| 10B | BR4 | SBC 4 | 70 | 7.4 | 0 |
| 11A | BR5 | SBC 5 | 29 | 71 | — |
| 11B | BR4 | SBC 5 | 29 | 40[D] | 30 |
| 12B | BR4 | SBC 6 | 43 | — | 24 |
| 13B | BR4 | SBC 7 | 51 | — | 6 |
| 14 | BR4 | — | — | 50 | 47 |

[C]For BR5, viscosity data at 14% solids in 60/40 toluene/methyl methacrylate (MMA). For BR4, viscosity data at 14% solids in toluene (solution viscosity).
[D]Estimated from trend line of concentration-viscosity relationship.

Examples 15-22

Table III summarizes the effects of the addition of various weight percentages of SBC 4 (70% styrene monomer content) on the solution viscosities of BR5, BR4, and BR1, as well as on the cold flow of BR4. The surprising result of a concurrent reduction in viscosity and in cold flow as the percentage of SBC 4 increases is evident from Table III. Example 20 demonstrates that a mixture of 25% SBC 4 with BR4 was sufficient to completely eliminate cold flow.

TABLE III

Examples 15-22.

| Example | SBC Weight (%) | BR5 Solution Viscosity (cP) | BR4 Solution Viscosity (cP) | BR1 Solution Viscosity (cP) | BR4 Cold Flow (%) |
|---|---|---|---|---|---|
| 15 | 0 | 17,400 | 2,400 | 5,100 | 47 |
| 16 | 5 | 7,600 | — | 2,300 | 49 |
| 17 | 10 | 4,200 | 1,900 | 1,500 | 35 |
| 18 | 15 | 1,800 | 1,700 | 1,100 | 36 |
| 19 | 20 | 1,700 | — | 740 | 14 |
| 20 | 25 | 390 | — | 270 | 0 |
| 21 | 50 | 150 | 260 | 130 | — |
| 22 | 100 | 44 | 38 | 39 | — |

Examples 23-30

Table IV summarizes the effects of the addition of various weight percentages of SBC 5 (29% styrene monomer content) on the solution viscosity of BR5, as well as on the cold flow of BR4. Similar to Examples 15-22, Examples 23-30 demonstrate the surprising result of a concurrent reduction in viscosity and in cold flow as the percentage of SBC 5 increases. With the lower styrene monomer content, amounts of SBC 5 over 30% were required to achieve a significant reduction in the cold flow of BR4.

TABLE IV

Examples 23-30.

| Example | SBC Weight (%) | BR5 Solution Viscosity (cP) | BR4 Cold Flow (%) |
|---|---|---|---|
| 23 | 0 | 17,400 | 47 |
| 24 | 10 | 8,500 | 42 |
| 25 | 15 | 6,100[E] | 40 |
| 26 | 20 | 5,000 | 29 |
| 27 | 25 | 4,000[E] | 29 |
| 28 | 37.5 | 2,800[E] | 11 |
| 29 | 50 | 2,000 | 9 |
| 30 | 100 | 1,300 | — |

[E]Estimated from trend line of concentration-viscosity relationship.

Examples 31-33

Table V summarizes the effects of the addition of various weight percentages of a general purposed polystyrene (100% styrene monomer content, grade EA3400, commercially available from Americas Styrenics) on the cold flow of BR4. Interestingly, polystyrene was not effective at reducing cold flow. For instance, the cold flow in Example 33 at 20% polystyrene loading was 39%, while it was 29% for Example 26 (20% SBC 5 with only 29% styrene monomer) and 14% for Example 19 (20% SBC 4 with 70% styrene monomer).

TABLE V

Examples 31-33.

| Example | Polystyrene Weight (%) | BR4 Cold Flow (%) |
|---|---|---|
| 31 | 10 | 43 |
| 32 | 15 | 37 |
| 33 | 20 | 39 |

Examples 34-49

Table VI summarizes the effect of styrene monomer content of the styrene block copolymer on the cold flow of BR4 at a 20 wt. % loading of the styrene block copolymer. Generally, SBC grades with greater than 50% styrene monomer content resulted in much greater cold flow reduction that those with less than 50% styrene monomer content.

TABLE VI

Examples 34-49.

| Example | SBC Grade | Styrene (%) | Cold Flow (%) |
|---|---|---|---|
| 34 | SBC 1 | 76 | 8 |
| 35 | SBC 3 | 75 | 5 |
| 36 | SBC 4 | 70 | 13 |
| 37 | SBC 8 | 65 | 32 |
| 38 | SBC 9 | 62 | 13 |
| 39 | SBC 7 | 51 | 12 |
| 40 | SBC 10 | 43 | 18 |
| 41 | SBC 6 | 43 | 26 |
| 42 | SBC 11 | 40 | 28 |
| 43 | SBC 12 | 40 | 33 |
| 44 | SBC 13 | 33 | 29 |
| 45 | SBC 14 | 29 | 32 |
| 46 | SBC 5 | 29 | 29 |
| 47 | SBC 15 | 25 | 38 |
| 48 | SBC 16 | 23 | 26 |
| 49 | SBC 17 | 30 | 29 |

Examples 50-57

Table VII summarizes the effect of styrene monomer contents of the styrene block copolymer on the cold flow of BR4 at a 5 wt. % and a 10 wt. % loading of the styrene block copolymer. With neat BR4 having a cold flow of 47%, only the SBC with 76% styrene monomer of Example 51 resulted in an appreciable reduction in cold flow at a 5 wt. % loading. At 10 wt. %, the general purpose polystyrene (Example 50) provided no benefit, while the SBC's with 65-76% styrene monomer (Examples 51-54) resulted in at least a 10 percentage point reduction in cold flow.

TABLE VII

Examples 50-57.

| Example | Styrene (%) | Cold Flow With 5% SBC (%) | Cold Flow With 10% SBC (%) |
|---|---|---|---|
| 50 | 100 | — | 43 |
| 51 | 76 | 29 | 24 |
| 52 | 75 | 48 | 34 |
| 53 | 70 | 49 | 35 |
| 54 | 65 | — | 34 |
| 55 | 51 | 50 | 40 |
| 56 | 43 | 41 | 47 |
| 57 | 29 | 42 | 40 |

Examples 58-63

Table VIII summarizes the effect of styrene monomer content of the styrene block copolymer on the cold flow of BR2 at a 20 wt. % loading of the styrene block copolymer. Neat BR2 rubber had the highest cold flow of any of the grades of rubber tested (67%). Nonetheless, the addition of 20 wt. % of an SBC dramatically reduced cold flow, regardless of styrene monomer content. Most effective in reducing cold flow were SBC grades with 70% or greater styrene monomer (Examples 58-60); in particular, SBC 1 almost completely eliminated the cold flow of BR2 (i.e., the cold flow was 1%).

TABLE VIII

Examples 58-63.

| Example | SBC Grade | Styrene (%) | Cold Flow (%) |
|---|---|---|---|
| 58 | SBC 3 | 75 | 6 |
| 59 | SBC 4 | 70 | 12 |
| 60 | SBC 1 | 76 | 1 |
| 61 | SBC 8 | 65 | 23 |
| 62 | SBC 6 | 43 | 14 |
| 63 | SBC 14 | 29 | 34 |

Examples 64-74

Table 1X summarizes the effect of the addition of various weight percentages of styrene block copolymers and the effect of styrene monomer content on the cold flow of BR4. In general, the addition of a styrene block copolymer to the butadiene rubber improved the cold flow performance, with higher weight percentages of the styrene block copolymer typically resulting in better cold flow performance (e.g., 15 wt. % or more). SBC grades with 50% or greater styrene monomer content, but less than 100% (i.e., not the polystyrene of Example 64), were more effective in improving cold flow.

TABLE IX

Examples 64-74.

| Example | Styrene (%) | % Cold Flow with 5% to 50% of the SBC in BR4 | | | | | | | |
|---|---|---|---|---|---|---|---|---|---|
| | | 5% | 10% | 15% | 20% | 25% | 30% | 37.5% | 50% |
| 64 | 100 | — | 43 | 36 | 39 | — | — | — | — |
| 65 | 76 | 29 | 24 | 33 | 8 | 0 | — | — | — |
| 66 | 75 | 48 | 34 | 24 | 5 | 0 | — | — | — |
| 67 | 70 | 49 | 35 | 36 | 13 | 0 | — | — | — |
| 68 | 65 | — | 34 | 36 | 32 | 13 | — | — | — |
| 69 | 62 | — | — | — | 13 | — | — | — | — |
| 70 | 51 | 50 | 40 | 31 | 12 | 6 | 5 | — | — |
| 71 | 43 | 41 | 47 | 38 | 26 | 24 | — | 9 | — |
| 72 | 40 | — | — | — | 30 | — | — | — | — |
| 73 | 29 | 42 | 40 | 29 | 29 | 11 | — | 11 | 9 |
| 74 | 25 | — | — | — | 38 | — | — | — | — |

Examples 75-90

Table X summarizes the Dimensional Stability Factor for neat BR1, BR2, and BR4, and for various mixtures of BR2 or BR4 with styrene butadiene block copolymers having a range of styrene monomer contents. The Dimensional Stability Factor (DSF, unit-less) was determined by calculating the final stress in an extended 16-hr cold flow test, and dividing this final stress by the stress of a standard single bale of rubber. A standard single bale of rubber used in the DSF determination was a 70 cm length×35 cm width×21 cm height bale of rubber having a 0.913 g/cm$^3$ density. Using the bale volume and rubber density, the mass of the bale was calculated to be about 47 Kg, with a resulting gravitational force of 460 N. The stress of the standard single bale of rubber was determined by dividing the force by the surface area of the bale (0.7 m×0.35 m). Thus, the stress of the standard single bale of rubber was 1878 Pa (0.272 psi), and this value is used for the calculation of all DSF's provided herein.

The final stress in the extended 16-hr cold flow test was determined as follows. The test material (base rubber, mixture of rubber and SBC, etc.) was dissolved in THF, mixed thoroughly, and dried in a vacuum to remove the solvent. Then, the test material was molded at 350° F. (177° C.) into a cylindrical specimen having a diameter of ¾" (1.9 cm) and a height of ½" (1.27 cm). The test specimen and a 350 g cylinder with a 3-inch (7.6 cm) diameter were preconditioned at 150° F. (65° C.) for 1 hr. Then, the test specimen was compressed by the 350 g weight for 16 hr at 150° F. (65° C.) as described hereinabove and in U.S. Pat. No. 3,758,656. The specimen height after the 16-hr test was measured and recorded.

For illustration purposes, the determination of the final stress in the extended 16-hr cold flow test for Example 75 is described, having a final specimen height of 0.312 in (0.8 cm). The initial volume of the cylindrical specimen was 3.62 cm$^3$ (0.22 in$^3$). Ignoring the elastic compressibility of the rubber samples for these calculations, the final volume of the cylindrical sample after 16 hr will be the same as the initial volume and, therefore, the surface area of Example 75 at the end of the 16-hr test was 4.5 cm$^2$. The 350 g weight exerts a force of 3.43 N, and after dividing by the final surface area of Example 75, the final stress in the extended 16-hr cold flow test was about 7600 Pa (1.1 psi). The DSF for Example 75 was determined by the ratio, 7600 Pa/1878 Pa, which equates to 4.0. The respective DSF for Examples 76-90 was determined in the same manner, using the final specimen height after the extended 16-hr test as the measurable variable.

Interestingly, as shown in Table X, the addition of 20% of a styrene block copolymer having 70% or more styrene content resulted in Dimensional Stability Factors (DSF's) of at least 4.0 for compositions containing BR2 and BR4. Without the SBC addition, the DSF's of neat BR2 and BR4 were 1.6 and 1.9, respectively (i.e., less than 2).

TABLE X

Examples 75-90.

| Example | Rubber Grade | SBC Grade | Styrene (%) | SBC Weight (%) | DSF |
|---|---|---|---|---|---|
| 75 | BR4 | SBC 4 | 70 | 20 | 4.0 |
| 76 | BR4 | SBC 1 | 76 | 20 | 5.4 |
| 77 | BR4 | SBC 6 | 43 | 20 | 3.2 |
| 78 | BR4 | SBC 7 | 51 | 20 | 4.2 |
| 79 | BR4 | SBC 8 | 65 | 20 | 2.7 |
| 80 | BR4 | — | — | 0 | 1.9 |
| 81 | BR1 | — | — | 0 | 3.0 |
| 82 | BR4 | SBC 5 | 29 | 20 | 2.7 |
| 83 | BR4 | SBC 3 | 75 | 20 | 4.4 |
| 84 | BR4 | SBC 3 | 75 | 15 | 3.0 |
| 85 | BR4 | SBC 3 | 75 | 10 | 2.6 |
| 86 | BR4 | SBC 3 | 75 | 5 | 2.0 |
| 87 | BR2 | SBC 4 | 70 | 20 | 4.4 |
| 88 | BR2 | SBC 1 | 76 | 20 | 5.8 |
| 89 | BR2 | SBC 5 | 29 | 20 | 2.1 |
| 90 | BR2 | — | — | 0 | 1.6 |

We claim:

1. A cold flow resistant composition comprising:
   (a) a diene rubber, the diene rubber comprising a polybutadiene rubber having from 60 to 95 mol % cis double bonds; and
   (b) a conjugated diene monovinylarene block copolymer, the conjugated diene monovinylarene block copolymer having from about 50 to about 95 wt. % monovinylarene monomer content, based on the total weight of the block copolymer;
wherein:
   a solution viscosity of the composition is less than a solution viscosity of the diene rubber; and
   a cold flow of the composition is less than a cold flow of the diene rubber.

2. The composition of claim 1, wherein the composition is a solid.

3. The composition of claim 1, wherein the composition is in the form of bale.

4. The composition of claim 1, wherein the composition contains less than 1 wt. % solvent.

5. The composition of claim 1, wherein:
   the cold flow of the diene rubber is at least 35%;
   the cold flow of the composition is less than 30%;
   the cold flow of the composition is at least 10 percentage points less than the cold flow of the diene rubber; or
   any combination thereof.

6. The composition of claim 1, wherein:
   the composition comprises from about 5 to about 50 wt. % of the conjugated diene monovinylarene block copolymer, based on the total weight of the composition; and
   the conjugated diene monovinylarene block copolymer has from about 55 to about 85 wt. % monovinylarene monomer content, based on the total weight of the block copolymer.

7. The composition of claim 1, wherein the conjugated diene monovinylarene block copolymer comprises at least 4 blocks selected from any combination of conjugated diene blocks, monovinylarene blocks, or conjugated diene monovinylarene mixed blocks.

8. The composition of claim 7, wherein:
   the first two blocks are monovinylarene blocks;
   the last block prior to a coupling agent is a conjugated diene block; or both.

9. The composition of claim 1, wherein the conjugated diene monovinylarene block copolymer comprises at least three consecutive conjugated diene monovinylarene mixed blocks.

10. The composition of claim 1, wherein the conjugated diene monovinylarene block copolymer comprises at least one of the following block structures:
   a) i-S-S-i-S-B-X;
   b) i-S-i-S-B-i-S-B-X;
   c) i-S-i-S-(B/S)-i-S-B-X;
   d) i-S-i-S-(B/S)-(B/S)-X;
   e) i-S-i-S-(B/S)-(B/S)-B-X;
   f) i-S-i-S-(B/S)-(B/S)-(B/S)-X;
   g) i-S-i-S-(B/S)-(B/S)-(B/S)-B-X;
   h) i-S-i-S-(B/S)-(B/S)-(B/S)-(B/S)-X; or
   i) i-S-i-S-(B/S)-(B/S)-(B/S)-(B/S)-B-X; wherein:
      S is a styrene block;
      B is a conjugated diene block;
      B/S is a conjugated diene monovinylarene mixed block;
      each i independently is an initiator, for starting a new polymer chain; and
      X is a coupling agent or a terminator.

11. The composition of claim 1, wherein the conjugated diene monovinylarene block copolymer comprises a styrene butadiene block copolymer.

12. A method for storage-stabilizing a bale of diene rubber, the method comprising adding a conjugated diene monovinylarene block copolymer to the diene rubber to form a cold flow resistant composition, and forming the composition into a bale, wherein:
   the conjugated diene monovinylarene block copolymer has from about 50 to about 95 wt. % monovinylarene monomer content, based on the total weight of the block copolymer;
   a solution viscosity of the composition is less than a solution viscosity of the diene rubber; and a cold flow of the composition is less than a cold flow of the diene rubber.

13. The method of claim 12, wherein the bale is dimensionally stable at 25° C. for at least 1 day.

14. The method of claim 12, wherein:
the diene rubber comprises a polybutadiene rubber;
the conjugated diene monovinylarene block copolymer comprises a styrene butadiene block copolymer; and
the bale is dimensionally stable at 25° C. for at least 6 months.

15. The composition of claim 1, wherein:
the composition comprises from about 10 to about 30 wt. % of the conjugated diene monovinylarene block copolymer, based on the total weight of the composition;
the conjugated diene monovinylarene block copolymer has from about 55 to about 85 wt. % monovinylarene monomer content, based on the total weight of the block copolymer;
the conjugated diene monovinylarene block copolymer comprises a styrene butadiene block copolymer;
the cold flow of the composition is less than 30%; and
the cold flow of the composition is at least 10 percentage points less than the cold flow of the diene rubber.

16. The composition of claim 15, wherein:
the conjugated diene monovinylarene block copolymer has from about 65 to about 80 wt. % monovinylarene monomer content, based on the total weight of the block copolymer; and
the cold flow of the composition is less than 15%.

17. The method of claim 12, wherein:
the composition comprises from about 5 to about 50 wt. % of the conjugated diene monovinylarene block copolymer, based on the total weight of the composition;
the conjugated diene monovinylarene block copolymer has from about 55 to about 85 wt. % monovinylarene monomer content, based on the total weight of the block copolymer;
the cold flow of the composition is less than 30%; and
the cold flow of the composition is at least 10 percentage points less than the cold flow of the diene rubber.

18. The method of claim 17, wherein:
the composition comprises from about 10 to about 30 wt. % of the conjugated diene monovinylarene block copolymer, based on the total weight of the composition;
the diene rubber comprises a polybutadiene rubber having from 60 to 95 mol % cis double bonds; and
the conjugated diene monovinylarene block copolymer comprises a styrene butadiene block copolymer.

19. The method of claim 18, wherein:
the conjugated diene monovinylarene block copolymer has from about 65 to about 80 wt. % monovinylarene monomer content, based on the total weight of the block copolymer; and
the cold flow of the composition is less than 15%.

20. The method of claim 18, wherein:
the bale is dimensionally stable at 25° C. for at least 1 day up to 12 months and/or the bale is dimensionally stable at 60° C. for at least 1 day up to 12 months; and
the composition has a Dimensional Stability Factor in a range from 2.5 to about 6.4.

21. The method of claim 17, wherein:
the composition comprises from about 10 to about 30 wt. % of the conjugated diene monovinylarene block copolymer, based on the total weight of the composition;
the diene rubber comprises a polybutadiene rubber having from 20 to 60 mol % cis double bonds; and
the conjugated diene monovinylarene block copolymer comprises a styrene butadiene block copolymer.

22. The method of claim 21, wherein:
the conjugated diene monovinylarene block copolymer has from about 65 to about 80 wt. % monovinylarene monomer content, based on the total weight of the block copolymer; and
the cold flow of the composition is less than 15%.

23. The method of claim 21, wherein:
the bale is dimensionally stable at 25° C. for at least 1 day up to 12 months and/or the bale is dimensionally stable at 60° C. for at least 1 day up to 12 months; and
the composition has a Dimensional Stability Factor in a range from 2.5 to about 6.4.

24. A cold flow resistant composition comprising:
(a) a diene rubber; and
(b) a conjugated diene monovinylarene block copolymer, the conjugated diene monovinylarene block copolymer having from about 50 to about 95 wt. % monovinylarene monomer content, based on the total weight of the block copolymer;
wherein:
a solution viscosity of the composition is less than a solution viscosity of the diene rubber;
a cold flow of the composition is less than a cold flow of the diene rubber; and
the composition is in the form of bale.

25. The composition of claim 24, wherein:
the composition comprises from about 5 to about 50 wt. % of the conjugated diene monovinylarene block copolymer, based on the total weight of the composition;
the conjugated diene monovinylarene block copolymer has from about 55 to about 85 wt. % monovinylarene monomer content, based on the total weight of the block copolymer;
the cold flow of the composition is less than 30%; and
the cold flow of the composition is at least 10 percentage points less than the cold flow of the diene rubber.

26. The composition of claim 25, wherein the bale is dimensionally stable at 25° C. for at least 1 day up to 12 months and/or the bale is dimensionally stable at 60° C. for at least 1 day up to 12 months.

27. The composition of claim 25, wherein:
the diene rubber comprises a polybutadiene rubber; and
the conjugated diene monovinylarene block copolymer comprises a styrene butadiene block copolymer.

28. The composition of claim 24, wherein:
the composition comprises from about 10 to about 30 wt. % of the conjugated diene monovinylarene block copolymer, based on the total weight of the composition;
the conjugated diene monovinylarene block copolymer has from about 65 to about 80 wt. % monovinylarene monomer content, based on the total weight of the block copolymer; and
the cold flow of the composition is less than 15%.

29. The composition of claim 28, wherein:
the diene rubber comprises a polybutadiene rubber; and
the conjugated diene monovinylarene block copolymer comprises a styrene butadiene block copolymer.

* * * * *